United States Patent
Hurtado et al.

(10) Patent No.: US 7,411,389 B1
(45) Date of Patent: Aug. 12, 2008

(54) METHOD OF DETECTING CHANGES IN OPERABILITY STATUS OF A SLIDER MOVER IN A DISK DRIVE

(75) Inventors: Anthony R. Hurtado, Cupertino, CA (US); Erhard Schreck, San Jose, CA (US); Duc Banh, San Jose, CA (US); Tim Glassburn, Milpitas, CA (US); Kazuhiro Saito, San Jose, CA (US); Scott Hughes, Cupertino, CA (US); Brian Strom, Cupertino, CA (US); Richard K. Oswald, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 318 days.

(21) Appl. No.: 11/101,297

(22) Filed: Apr. 7, 2005

Related U.S. Application Data

(60) Provisional application No. 60/560,832, filed on Apr. 8, 2004.

(51) Int. Cl.
*G11B 27/00* (2006.01)
*G11B 5/00* (2006.01)
(52) U.S. Cl. .......................... 324/210; 360/69
(58) Field of Classification Search .................. 360/69, 360/71, 128, 78.04; 324/212, 210–211
See application file for complete search history.

(56) References Cited

U.S. PATENT DOCUMENTS

| | | |
|---|---|---|
| 4,777,544 A | 10/1988 | Brown et al. |
| 5,377,058 A | 12/1994 | Good et al. |
| 5,421,943 A | 6/1995 | Tam et al. |
| 5,539,592 A | 7/1996 | Banks et al. |
| 5,677,808 A | 10/1997 | Cha et al. |
| 5,862,015 A | 1/1999 | Evans et al. |
| 5,880,626 A | 3/1999 | Dean |
| 5,880,899 A | 3/1999 | Blachek et al. |
| 5,959,801 A | 9/1999 | Gillis et al. |
| 5,965,840 A | 10/1999 | Nagarajan et al. |
| 5,991,113 A | 11/1999 | Meyer et al. |
| 5,999,372 A | 12/1999 | Peterson et al. |
| 6,011,239 A | 1/2000 | Singh et al. |
| 6,195,219 B1 | 2/2001 | Smith |
| 6,288,856 B1 | 9/2001 | Ottesen et al. |
| 6,359,746 B1 | 3/2002 | Kakekado et al. |
| 6,452,740 B1 | 9/2002 | Ghoshal |
| 6,538,836 B1 | 3/2003 | Dunfield et al. |

(Continued)

OTHER PUBLICATIONS

U.S. Appl. No. 10/211,671, filed Aug. 2, 2002, McKenzie et al.

*Primary Examiner*—Bot LeDynh
(74) *Attorney, Agent, or Firm*—Westman, Champlin & Kelly, P.A.

(57) ABSTRACT

A method for monitoring the operability of a slider of a disk drive includes the steps of providing a slider that includes a read/write head that magnetically interacts with a storage disk, and a slider mover that adjusts a head-to-disk spacing, controlling an electrical stimulus to the slider mover with a drive circuitry, measuring an actual electrical response from the slider mover with the drive circuitry, and comparing the actual electrical response to an expected electrical response to determine an operability status of the slider mover. Further, changes in the actual electrical response can be monitored and used to predict future failure of the slider mover.

35 Claims, 7 Drawing Sheets

U.S. PATENT DOCUMENTS

| | | |
|---|---|---|
| 6,636,374 B1 | 10/2003 | Goh et al. |
| 6,735,036 B1 | 5/2004 | Olim |
| 6,757,124 B2 | 6/2004 | Kelemen |
| 6,768,610 B1 | 7/2004 | Morris et al. |
| 7,095,587 B2 | 8/2006 | Kurita et al. |
| 7,158,325 B1 | 1/2007 | Hu et al. |
| 2001/0030822 A1 | 10/2001 | Boutaghou et al. |
| 2002/0067565 A1 | 6/2002 | Kelemen |
| 2002/0097528 A1 | 7/2002 | Williams et al. |
| 2003/0011915 A1 | 1/2003 | Riddering et al. |
| 2003/0174430 A1 | 9/2003 | Takahashi et al. |
| 2003/0193727 A1 | 10/2003 | Fioravanti et al. |
| 2005/0052773 A1 | 3/2005 | Suk |
| 2005/0057841 A1 | 3/2005 | Stover et al. |
| 2005/0078400 A1 | 4/2005 | Hassan |

METHOD OF DETECTING CHANGES IN OPERABILITY STATUS OF A SLIDER MOVER IN A DISK DRIVE

RELATED APPLICATION

This application claims the benefit on U.S. Provisional Application Ser. No. 60/560,832 filed on Apr. 8, 2004. The contents of U.S. Provisional Application Ser. No. 60/560,832 are incorporated herein by reference.

BACKGROUND

Disk drives are widely used in computers, consumer electronics and data processing systems for storing information in digital form. The disk drive typically includes one or more storage disks and one or more head suspension assemblies. Each head suspension assembly includes a slider having an air bearing surface, and a read/write head that transfers information to and from the storage disk. The rotation of the storage disk causes the slider to ride on an air bearing so that the read/write head is at a distance from the storage disk that is referred to as a "head-to-disk spacing" (also sometimes referred to herein as a "flying height").

Because today's disk drives utilize storage disks having increasingly high densities of data tracks, adjusting the head-to-disk spacing to maintain a relatively low flying height during varying operations of the disk drive has become of great importance. For instance, nominal fly heights can now be as small as 5 nanometers or less. However, this desire for a small head-to-disk spacing must be balanced with tribological concerns in order to avoid damage to the read/write head and/or the storage disk, as well as loss of data.

Recently, systems and methods for controlling the head-to-disk spacing have been advanced in the disk drive industry. For example, the slider can include a read/write head and a separate slider mover to which the controller directs electrical current. A temperature change of the slider mover occurs as a result of the electrical current, resulting in a deformation of a portion of the slider, thereby influencing the head-to-disk spacing. In the past, accurately monitoring and/or determining the actual head-to-disk spacing during in situ operation has been elusive. Further, attributing a specific change in the head-to-disk spacing to one or more causes in a conventional disk drive has been particularly challenging.

SUMMARY

The present invention is directed to a method for monitoring the operability of a slider of a disk drive. In one embodiment, the method includes the steps of providing a slider that includes a read/write head that magnetically interacts with a storage disk, and a slider mover that adjusts a head-to-disk spacing, controlling an electrical stimulus to the slider mover with a drive circuitry, measuring an actual electrical response from the slider mover with the drive circuitry, and comparing the actual electrical response to an expected electrical response to determine an operability status of the slider mover.

In another embodiment, the step of controlling an electrical stimulus includes controlling a voltage across the slider mover, and the step of measuring an actual electrical response includes determining an electrical current that passes through the slider mover. In an alternative embodiment, the step of controlling an electrical stimulus includes controlling an electrical current that is directed to the slider mover, and the step of measuring an actual electrical response includes determining the voltage across the slider mover. Further, the step of comparing the actual electrical response can include determining whether the actual electrical response falls within a predetermined range of expected electrical responses. In the event the actual electrical response falls outside the predetermined range or differs from the expected electrical response by a predetermined percentage, notification is provided to the user.

In another embodiment, the method can include calculating the resistance of the slider mover based on the electrical stimulus and the actual electrical response. In this embodiment, the calculated resistance can be compared with a previously determined expected resistance for the slider mover. Further, the step of comparing can include monitoring changes in the actual electrical response over time. In one embodiment, the method can also include predicting the timing of a future failure of the slider mover with the drive circuitry based on the change in the actual electrical response over time.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

The present invention provides various methods for determining the operability of a slider mover that adjusts a head-to-disk spacing in a disk drive.

Figure 1:
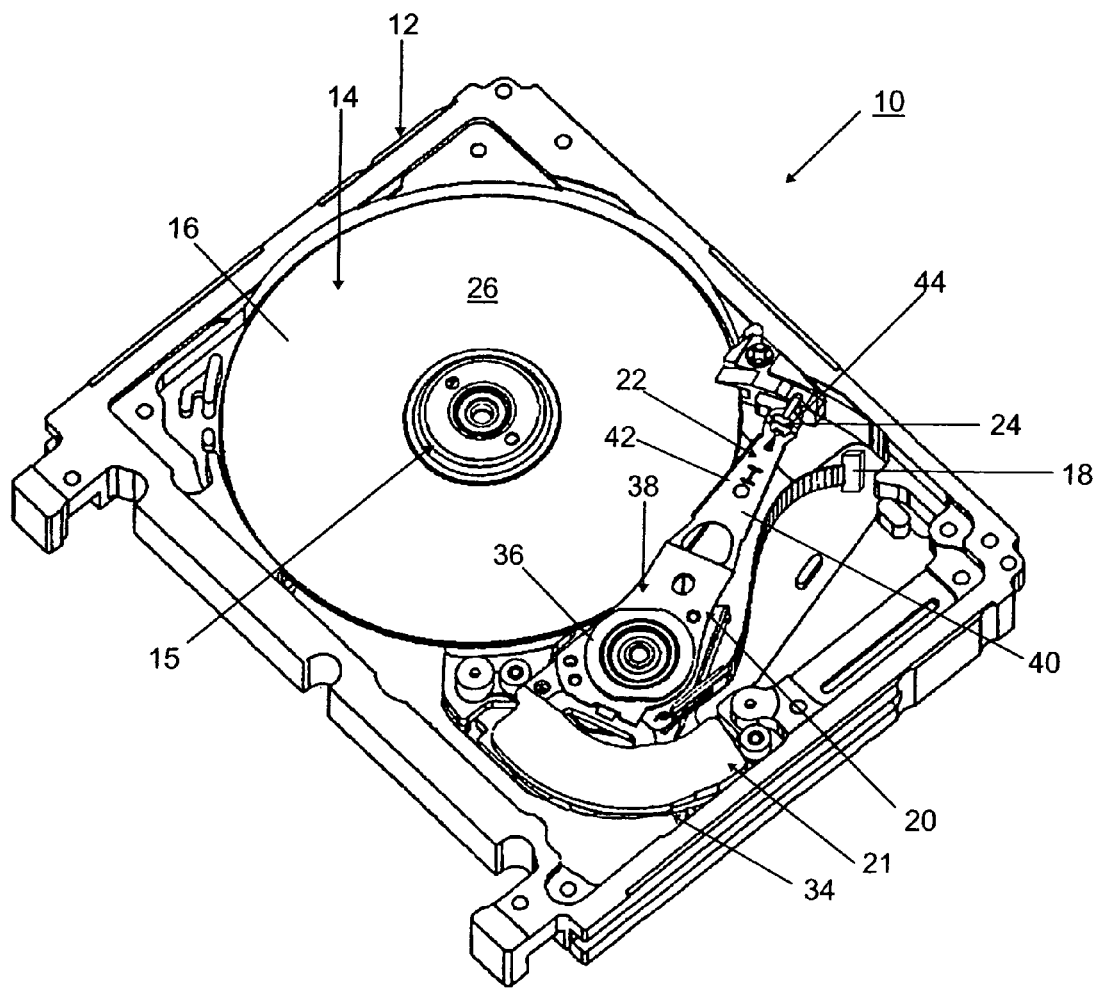
FIG. 1 is a perspective view of a disk drive having features of the present invention.

FIG. 1 illustrates a perspective view of a disk drive 10 that includes (i) a drive housing 12, (ii) a disk assembly 14 having a spindle motor 15 and one or more storage disks 16 coupled to the spindle motor 15, (iii) a drive circuitry 18, and (iv) a head stack assembly 20 including an actuator assembly 21 and one or more head suspension assemblies 22, with each head suspension assembly 22 including a slider 24.

Each storage disk 16 includes one or more disk surfaces 26 that each has a plurality of concentric data tracks (not shown) that store data, including a target track. Further, the storage disk 16 can also include non-data tracks, such as servo tracks. Data is read from the storage disk 16 during a read operation and data is transferred to the storage disk 16 during a write operation. The read and write operations can each include a seek mode during which the actuator assembly 21 rapidly moves the slider 24 to near the target track. The read and write operations can also include a settle mode which commences once the slider 24 is positioned proximate the target track. Further, the read and write operations include a track following mode once the slider 24 has settled or stabilized over the target track. Additionally, once the slider 24 stabilizes over the target track, the read and/or write operations include the transfer of data between the slider 24 and the storage disk 16.

The drive circuitry 18 sends and/or receives electrical signals from the slider 24 during read and/or write operations of the disk drive 10. In one embodiment, the drive circuitry 18 controls and/or directs current to the slider 24 to dynamically adjust and control the head-to-disk spacing. Alternatively, the drive circuitry 18 can control a voltage across portions of the slider 24 from a voltage source (not shown). In still an alternative embodiment, the drive circuitry 18 can concurrently control both the current to the slider 24 and the voltage across various portions of the slider 24.

As used herein, current, voltage and/or both current and voltage (also sometimes referred to herein as power) are generically referred to as an electrical stimulus, or simply a "stimulus". Further, an electrical signal that is received, measured or otherwise determined by the drive circuitry 18 from the slider 24 is referred to herein as an actual electrical response, or simply a "response".

The drive circuitry 18 can be included in a printed circuit board assembly (not shown). Further, the drive circuitry 18 can include one or more preamplifiers that can adjust and/or amplify the electrical signals that are transmitted between the slider 24 and other components of the drive circuitry 18. Moreover, the drive circuitry can include one or more drivers (not shown) that can control and/or direct a specific stimulus, i.e., current, voltage and/or power, to various structures within the slider 24. In one embodiment, the drive circuitry 18 is secured to and/or enclosed by the drive housing 12.

The head stack assembly 20 illustrated in FIG. 1 also includes an actuator motor 34, an actuator hub 36, one head suspension assembly 22, and an actuator arm 38. The actuator motor 34 rotates the actuator arm 38 and the head suspension assembly 22 relative to the storage disk 16. The head stack assembly 20, alternately, can include a plurality of actuator arms 38 that each supports up to two head suspension assemblies 22. Each head suspension assembly 22 includes one slider 24 and a suspension 40 having a load beam 42 and a flexure 44. The suspension 40 is secured to the actuator arm 38, and supports the slider 24 proximate one of the disk surfaces 30 of the storage disk 16.

The slider 24 transfers information between the drive circuitry 18 and the storage disk 16. The design of the slider 24 can vary pursuant to the teachings provided herein. Further, various embodiments of disk drives and slider assemblies are described in co-pending U.S. patent application Ser. No. 10/211,671, filed by McKenzie, et al. on Aug. 2, 2002, and assigned to Maxtor Corporation. The contents of U.S. patent application Ser. No. 10/211,671 are incorporated herein by reference.

Figure 2A:
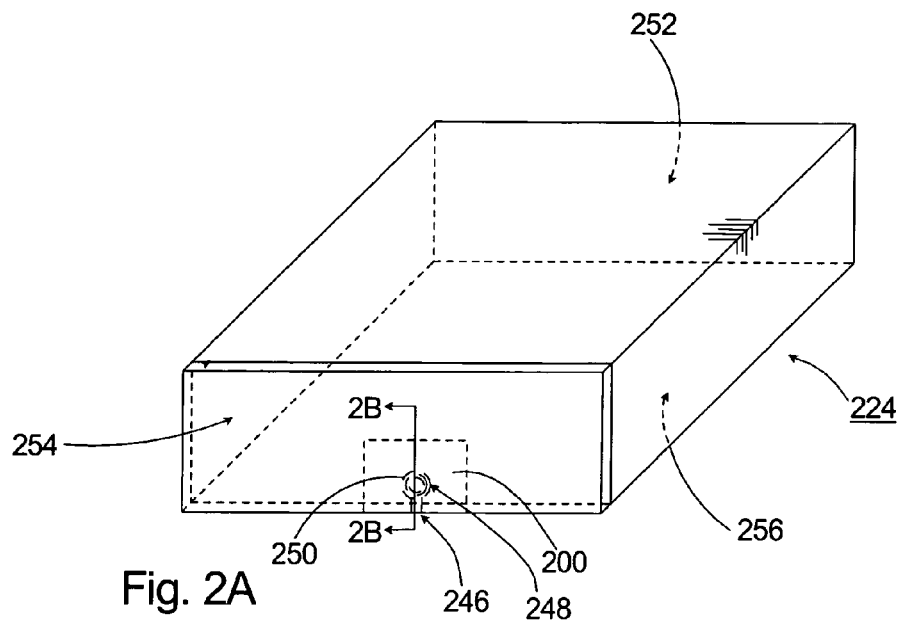
FIG. 2A is a perspective view of a slider having features of the present invention including a slider mover.

FIG. 2A illustrates a rear perspective view of one embodiment of the slider 224. In this embodiment, the slider 224 includes a read/write head 246 and a slider mover 200 (illustrated in phantom). The read/write head 246 includes a write head 248 (illustrated in phantom) having a write element 250. The slider 224 further includes a leading surface 252, an opposed trailing surface 254 and a bottom first surface 256, which forms an air bearing surface (ABS) of the slider 224. The slider mover 200 is selectively used to move and/or deform portions of the slider 224 near the read/write head 246 in order to change the head-to-disk spacing.

More specifically, a stimulus from the drive circuitry 218 causes the slider mover 200 to generate heat independently from heat generated by the write element 250. The heat is at least partially transferred to the area near the read/write head 246, thereby selectively causing thermal deformation of the read/write head 246 independently from any deformation (also referred to as "pole tip protrusion") that may be caused by heating of the write element 250 during a write operation, for example. The extent to which the slider mover 200 moves and/or deforms the slider 224 is at least partially dependent upon the extent or level of the stimulus, as described in greater detail below.

Figure 2B:
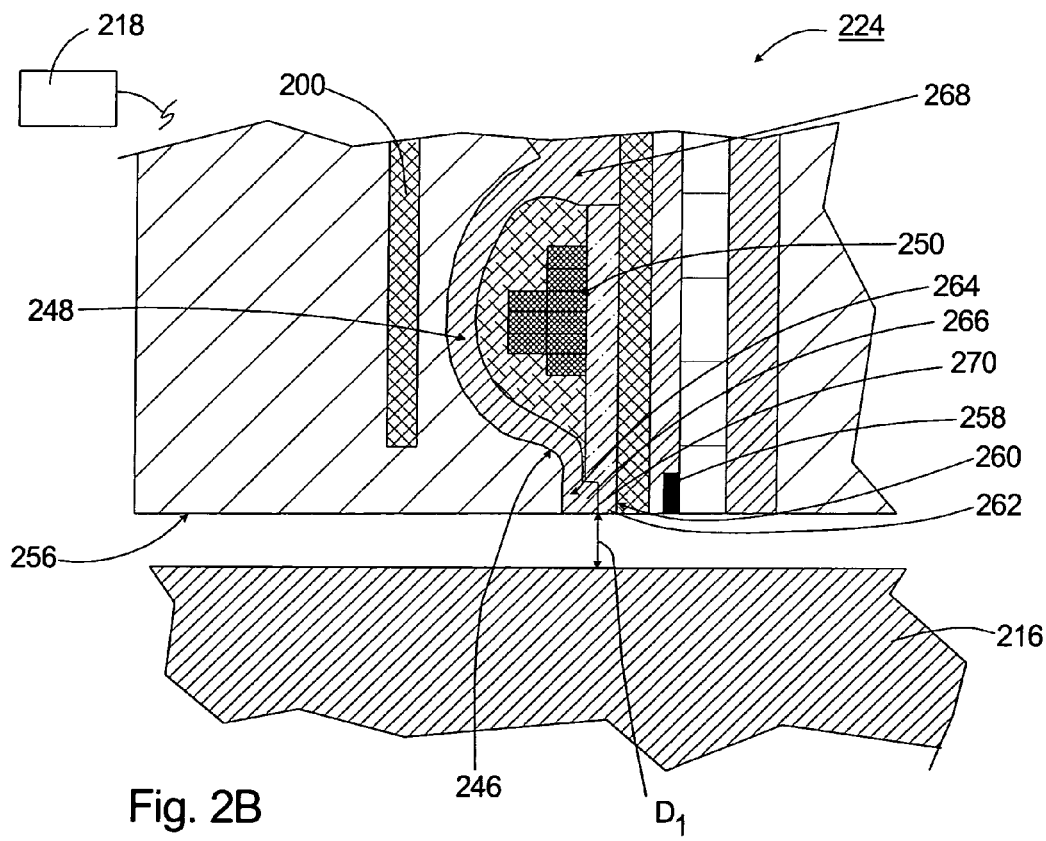
FIG. 2B is an enlarged cross-sectional view of a portion the slider in FIG. 2A while a first level of current is directed to the slider mover.

FIG. 2B is an enlarged, partial cross-sectional illustration of the slider 224 shown in FIG. 2A, and a portion of a storage disk 216. FIG. 2B illustrates that the read/write head 246 includes a read head 258 and the write head 248.

The positioning, dimensions and number of slider movers 200 can be varied. Moreover, the composition and configuration of the slider mover 200 can be varied to suit the design requirements of the slider 224 and the disk drive 10. For example, the slider mover 200 can include a single planar layer that is substantially parallel to the trailing surface 254. Alternatively, the slider mover 200 can also be positioned to not be parallel to the trailing surface 254. Further, the slider mover 200 can include a plurality of parallel or non-parallel planar or non-planar layers that are either parallel or non-parallel relative to the trailing surface 254. In this embodiment, the slider movers 200 can be electrically connected in series or in parallel, or the slider movers 200 can be individually electrically connected to provide a more customized control of the movement of portions of the slider 224.

In non-exclusive, alternative embodiments, the slider mover 200 can be disk shaped, elliptical, semi-circular, triangular, trapezoidal or another suitable configuration. In another embodiment, the slider mover 200 can include a continuous heating element having an even number of substantially parallel deformer legs (not shown) that wind back and forth in any direction near the write element 250. For example, the slider mover 200 can wind back and forth in a serpentine-shaped pattern. Alternately, the slider mover 200 can be somewhat coil shaped.

With these designs, the slider mover 200 can be configured to provide an increased amount of exposed surface area to efficiently transfer heat from the slider mover 200 to the slider 224. Additionally, the increased amount of exposed surface area of the slider mover 200 promotes a secure bonding between the slider mover 200 and other adjacent layers of the slider 224.

Depending upon the type of material that is used to form the slider mover 200, the resistance of the slider mover 200 can vary with changes in temperature. With certain materials, the degree to which the resistance of the slider mover 200 varies is greater than with other materials.

Thus, depending upon the design requirements of the disk drive 10, the electrical resistivity of the material used to form the slider mover 200 can vary. In one embodiment, the slider mover 200 is formed from a material having a relatively low thermal coefficient of resistivity. With this design, changes in the temperature of the slider mover 200 have a decreased impact on the resistance of the slider mover 200. In alternative embodiments, the slider mover 200 can be formed from a material having a moderate or relatively high thermal coefficient of resistivity.

In the embodiment illustrated in FIG. 2B, the slider mover 200 is not in direct electrical communication with the read/ write head 246. Stated another way, the slider mover 200 can be substantially electrically isolated from the read/write head 246, e.g. the slider mover 200 is not in direct contact with the read/write head 246, nor is there any significant electrical coupling between the slider mover 200 and the read/write head 246. Alternatively, the slider mover 200 and the read/write head 246 can be electrically coupled, or they can be directly connected.

In the embodiment illustrated in FIG. 2B, the write head 248 includes the write element 250, a leading pole 260 having a leading pole tip 262, a trailing pole 264 having a trailing pole tip 266, a yoke 268, and a write head gap 270.

More specifically, FIG. 2B shows the general relationship between the read/write head 246 and the storage disk 216 (also referred to herein as a first head-to-disk spacing $D_1$) when the drive circuitry 218 is directing a first level of stimulus to the slider mover 200. As used herein, the first level of stimulus can be a relatively low stimulus level or no stimulus, for example. At various times during operation of the disk drive, relatively little stimulus or no stimulus is directed to the slider mover 200, and little or no deformation caused by the slider mover 200 occurs in the area of the read/write head 246 or the air bearing surface 256, as illustrated in FIG. 2B.

Figure 2C:
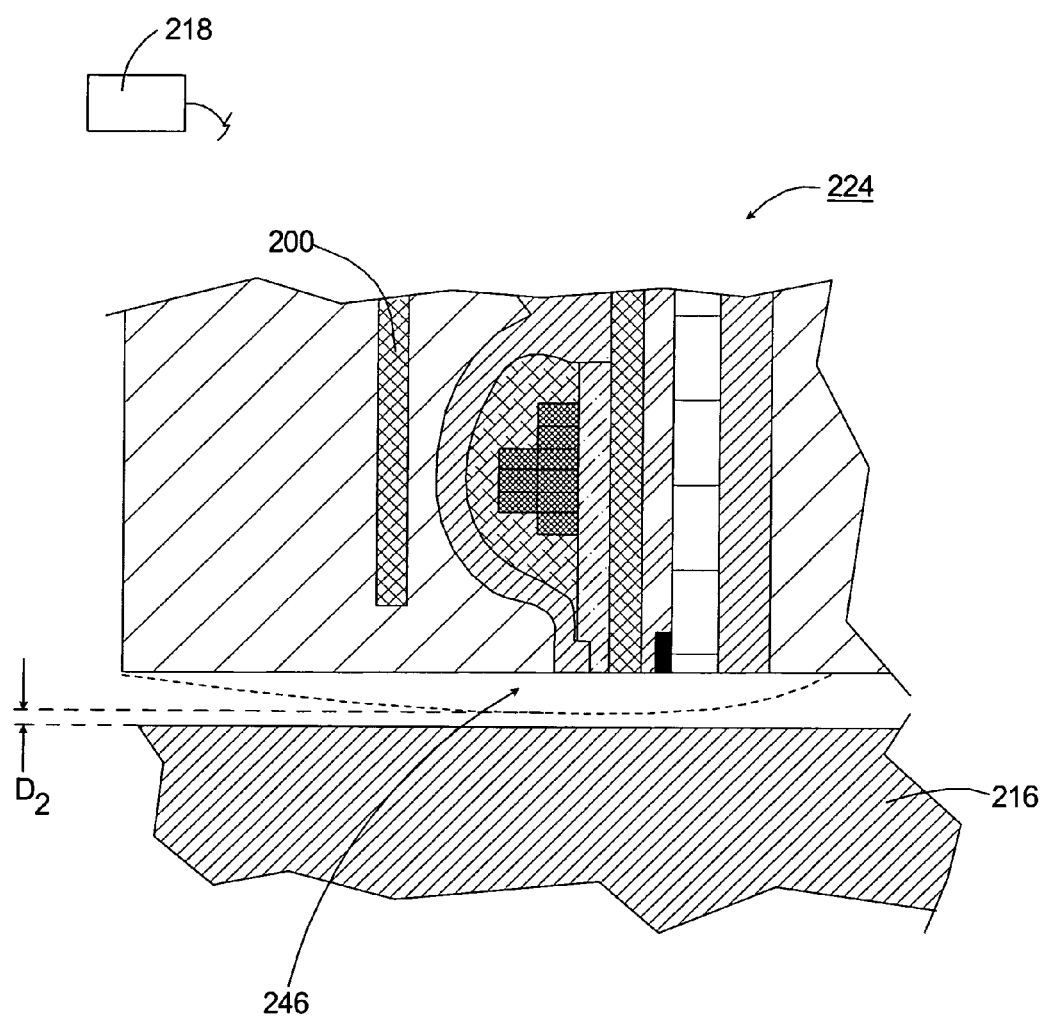
FIG. 2C is an enlarged cross-sectional view of a portion of the slider in FIG. 2A including a simplified representation of a portion of the slider while a second level of current is directed to the slider mover.

FIG. 2C illustrates the relationship between the read/write head 246 and the storage disk 216 (also referred to herein as a second head-to-disk spacing $D_2$) once the drive circuitry 218 directs a second level of stimulus to the slider mover 200. In FIG. 2C, the second level of stimulus is greater than the first level of stimulus, and causes sufficient thermal expansion of a portion of the slider 224 toward the storage disk 216. In some embodiments, the second level of stimulus can be sufficient to cause non-destructive head-to-disk contact. In these embodiments, the non-destructive head-to-disk contact can be utilized to facilitate monitoring and/or adjusting the actual head-to-disk spacing as required by the disk drive 10.

The portion of the slider 224 illustrated in phantom in FIG. 2C is shown in phantom as a relatively smooth curve for purposes of illustration and to show the contrast with the slider 224 in the first position (illustrated by solid lines). It is recognized that when the slider 224 is in the second position, the actual configuration of the slider 224 including the read/write head 246 may not be completely smooth, but can have a somewhat jagged or otherwise inconsistent configuration.

As provided herein, applying the second level of stimulus to the slider mover 200 can be used to intentionally induce a decreased head-to-disk spacing, or even head-to-disk contact, during production and/or self-testing of the disk drive, and/or on a predetermined (automatic) or an "as needed" (manual) basis during in situ operation of the disk drive 10. For example, by purposely causing non-destructive head-to-disk contact or withdrawing the slider 224 from non-destructive head-to-disk contact, the disk drive 10 can be calibrated to more precisely determine, monitor and/or adjust the head-to-disk spacing during various operations of the disk drive 10. Systems and methods for determining when head-to-disk contact occurs or ceases to occur are disclosed in U.S. patent application Ser. No. 11/101,112, filed by Schreck et al., and assigned to Maxtor Corporation. To the extent permitted, the contents of U.S. patent application Ser. No. 11/101,112 is incorporated herein by reference.

As indicated above, the drive circuitry 218 can send or direct a stimulus to the slider mover 200 to heat the slider mover 200. Heat is generated at the slider mover 200 as a result of the resistivity of the material used to form the slider mover 200. The drive circuitry 218 can control the voltage, the current, or a combination of both voltage and current, that is directed to the slider mover 200.

Figure 3:
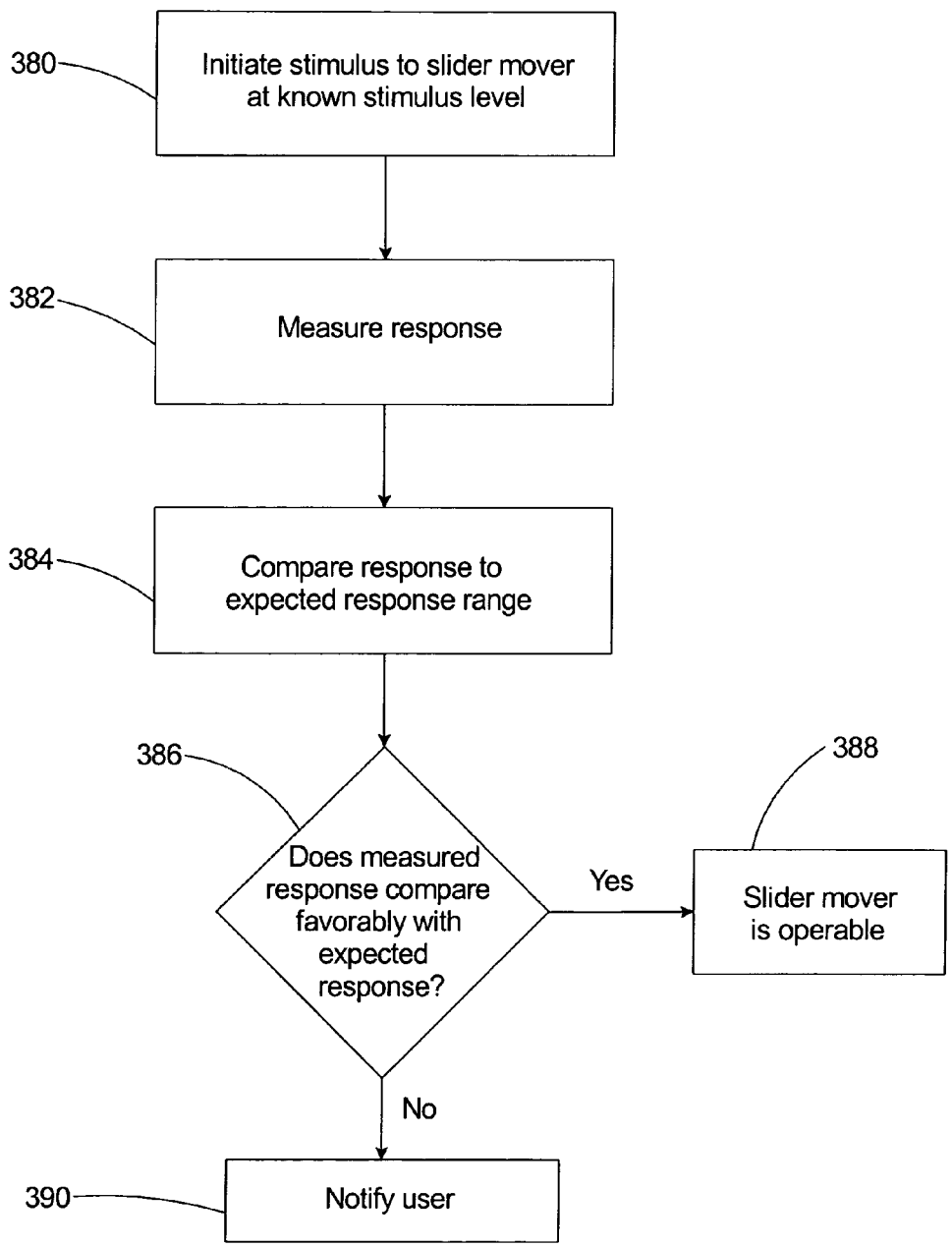
FIG. 3 is a flow chart outlining the steps of one embodiment for determining operability of the slider mover.

FIG. 3 is a flow chart generally describing one embodiment of a method for detecting changes in the operability status of the slider mover. In this embodiment, an electrical stimulus is initiated and sent to the slider mover at step 380. As provided above, the type of stimulus can vary. In one embodiment, the stimulus is initiated by the drive circuitry, which can include a driver that determines the magnitude or level of the specific stimulus to be delivered to the slider mover. At step 382, an electrical response is measured either at the slider mover or on the downstream side of the slider mover in the electrical circuit.

At step 384, the measured response from step 382 is compared to an expected response. The expected response 384 can include one or more values that are stored in the drive circuitry, on the storage disk, or elsewhere in the disk drive which were determined at the time of manufacturing and/or testing of the drive. In one embodiment, the expected response 384 can include a range of response values.

At step 386, the drive circuitry is queried as to whether the measured response 382 compares favorably with the expected response 384. For example, at step 388, the drive circuitry can determine that the slider mover is operating within the intended parameters at the time of manufacture because the measured response 382 is identical to the expected response 384. Alternatively, the drive circuitry can determine whether the measured response 382 is substantially similar to the expected response 384, which can also indicate that the slider mover is operating within the intended parameters at the time of manufacture. Still alternatively, in embodiments where the expected response 384 includes an acceptable range of expected responses, the drive circuitry can determine whether the measured response 382 falls within the acceptable range, which can also indicate that the slider mover is operating within the intended parameters at the time of manufacture.

In the event that the measured response 382 is either (i) not identical to the expected response 384, (ii) not substantially similar to the expected response 384, or (iii) outside the range of acceptable expected responses 384, the drive circuitry can determine that the slider mover is not operating within the intended parameters at the time of manufacture. More specifically, in non-exclusive alternative embodiments, if the measured response 382 deviates by at least approximately 2%, 5%, 10%, 15%, 20%, 25%, 30%, 40% or 50% from the expected response, the drive circuitry can conclude that a problem with the electrical circuitry that includes the slider mover, or with the slider mover itself, exists.

For example, depending upon the magnitude of the measured response 382 relative to the expected response 384, the drive circuitry can determine that the electrical circuit that includes the slider mover has been short-circuited, is an open circuit, or some other problematic condition. In these cases, the drive circuitry can notify the user of the disk drive at step 390. As used herein, notifying the user 390 can include any action taken by the drive circuitry and/or the disk drive to inhibit the occurrence of damage to the disk drive or data stored on the disk drive. For example, an error message can be displayed to the user, the disk drive can be shut down, etc.

Figure 4:
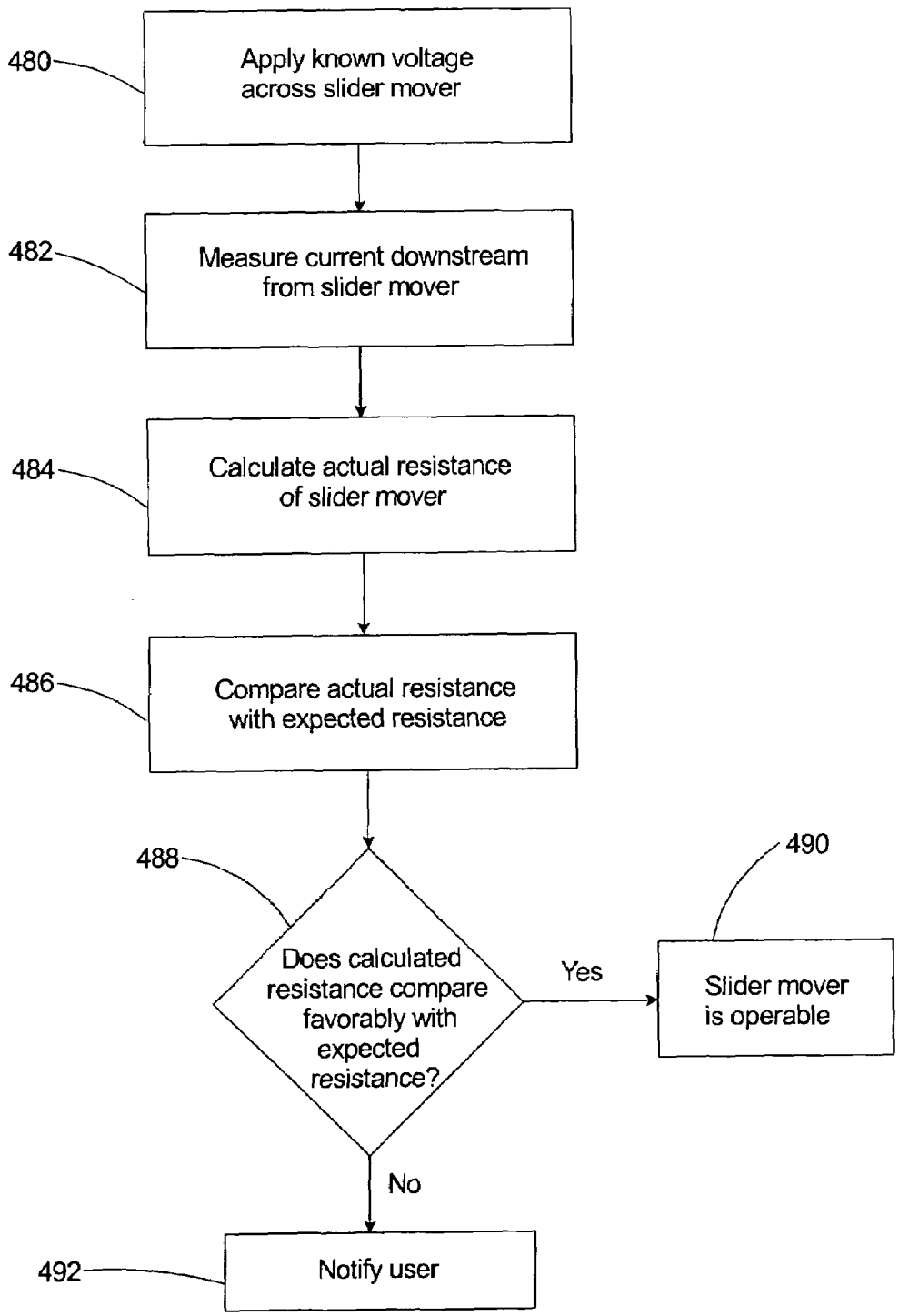
FIG. 4 is a flow chart outlining the steps of another embodiment for determining operability of the slider mover.

FIG. 4 is a flow chart describing another embodiment of a method for detecting changes in the operability status of the slider mover. In this embodiment, the drive circuitry includes a voltage source driver that can provide a beneficial decay of delivered power as a function of resistance and temperature of the slider mover.

At step 480 the stimulus that is initiated includes a voltage which is applied across the slider mover. At step 482, a measurement of an electrical current is taken or otherwise determined. In this embodiment, the measurement of electrical current is taken downstream from the slider mover, e.g., after the slider mover, along the circuit. The measurement or determination of electrical current can be performed by any suitable method known to those skilled in the art.

Once the voltage and current are determined, the actual resistance of the slider mover can be calculated at step 484, by Ohm's law: V=IR, where V=voltage in volts, I=current in amperes, and R=resistance in ohms.

At step 486, the actual resistance 484 of the slider mover can be compared with an expected resistance that can include one or more resistance values that are stored in the drive circuitry or elsewhere in the disk drive which were determined at the time of manufacturing and/or testing of the drive. In one embodiment, the expected resistance 486 can include a range of acceptable resistance values.

At step 488, the drive circuitry is queried as to whether the actual resistance 484 compares favorably with the expected resistance 486. For example, at step 490, the drive circuitry can determine that the slider mover is operating within the intended parameters at the time of manufacture because the actual resistance 484 is identical to the expected resistance 486. Alternatively, the drive circuitry can determine whether the actual resistance 484 is substantially similar to the expected resistance 486, which can also indicate that the slider mover is operating within the intended parameters at the time of manufacture. Still alternatively, in embodiments where the expected resistance 486 includes an acceptable range of expected responses, the drive circuitry can determine whether the actual resistance 484 falls within the acceptable range, which can also indicate that the slider mover is operating within the intended parameters at the time of manufacture.

In the event that the actual resistance 484 is either (i) not identical to the expected resistance 486, (ii) not substantially similar to the expected resistance 486, or (iii) outside the range of acceptable expected resistances 486, the drive circuitry can determine that the slider mover is not operating within the intended parameters at the time of manufacture. More specifically, in non-exclusive alternative embodiments, if the actual resistance 484 deviates by at least approximately 2%, 5%, 10%, 15%, 20%, 25%, 30%, 40% or 50% from the expected resistance 486, the drive circuitry can conclude that a problem with the electrical circuitry including the slider mover, or with the slider mover itself, exists.

For example, depending upon the magnitude of the actual resistance 484 relative to the expected resistance 486, the drive circuitry can determine that the electrical circuit that includes the slider mover has been short-circuited, is an open circuit, or some other problematic condition, and can notify the user of the disk drive at step 492.

It is recognized that the step of calculating the actual resistance (step 484) can be omitted, and that determining the current with a given voltage is actually an indirect determination of the resistance of the slider mover. Stated another way, in some embodiments, it is unnecessary to actually determine the resistance, provided an acceptable current value or range has previously been established for a given voltage. In these embodiments, the current is compared with the acceptable current value or range of values somewhat similarly to the comparison using the measured response and expected response described herein.

Figure 5:
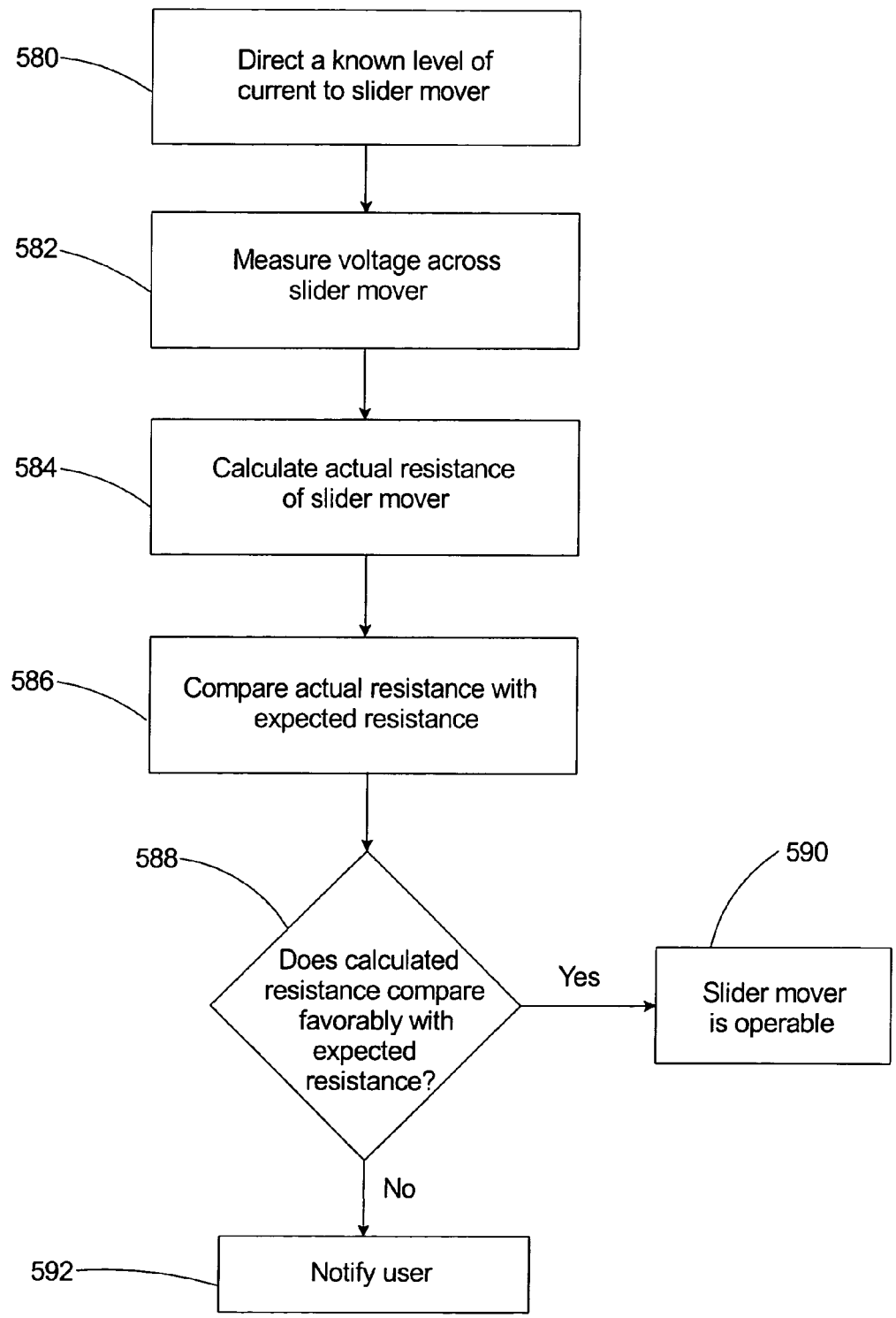
FIG. 5 is a flow chart outlining the steps of a further embodiment for determining operability of the slider mover.

FIG. 5 is a flow chart describing yet another embodiment of a method for detecting changes in the operability status of the slider mover. In this embodiment, the drive circuitry includes a current source driver. At step 580, the stimulus that is initiated is an electrical current which is directed to the slider mover. At step 582, a measurement of the voltage across the slider mover is taken or otherwise determined. In this embodiment, the measurement of voltage can be performed by any suitable method known to those skilled in the art.

Once the voltage and current are determined, the actual resistance of the slider mover can be calculated at step 584, somewhat similarly as previously described using Ohm's law: V=IR. At step 586, the actual resistance 584 of the slider mover is compared with an expected resistance as previously disclosed. At step 588, the drive circuitry is queried as to whether the actual resistance 484 compares favorably with the expected resistance 586. At this point, the determination is made by the drive circuitry whether the operability of the slider mover is as expected, or whether a problem may exist, as provided above.

It is recognized that the step of calculating the actual resistance (step 584) can be omitted, and that determining the voltage with a given current is actually an indirect determination of the resistance of the slider mover. Stated another way, in some embodiments, it is unnecessary to actually determine the resistance, provided an acceptable voltage value or range has previously been established for a given level of current. In these embodiments, the voltage across the slider mover is compared with the acceptable voltage value or range of voltage values somewhat similarly to the comparison using the measured response and expected response described herein.

In an alternative embodiment, a hybrid driver that controls both voltage and current is utilized which can incorporate feedback based on either current draw or delivered voltage. The hybrid driver requires that both voltage and current be monitored by the drive circuitry to obtain an accurate resistance of the slider mover. However, with this embodiment, an open condition or a short circuit condition can be determined by monitoring one of the voltage and the current.

In still an alternative embodiment of the present invention, the measured, calculated or otherwise determined response can be observed over time, and/or logged by the drive circuitry for predicting future behavior of the slider mover. For example, the drive circuitry can determine and store the response at predetermined time intervals. The drive circuitry can further determine whether a declining response value is detected, and can predict when a failure (or other projected problem) of the slider mover may be imminent or may otherwise occur in the future. In this embodiment, the response can be determined by any of the methods provided herein.

With each of the methods provided herein, the operability of the slider mover can be determined during the manufacturing process and/or in situ. For example, during actual use of the disk drive, the operability status of the slider mover can be performed on startup, during various operations of the disk drive, during self-tests, on a set periodic basis, on command, or on any other predetermined or random schedule.

Figure 6:
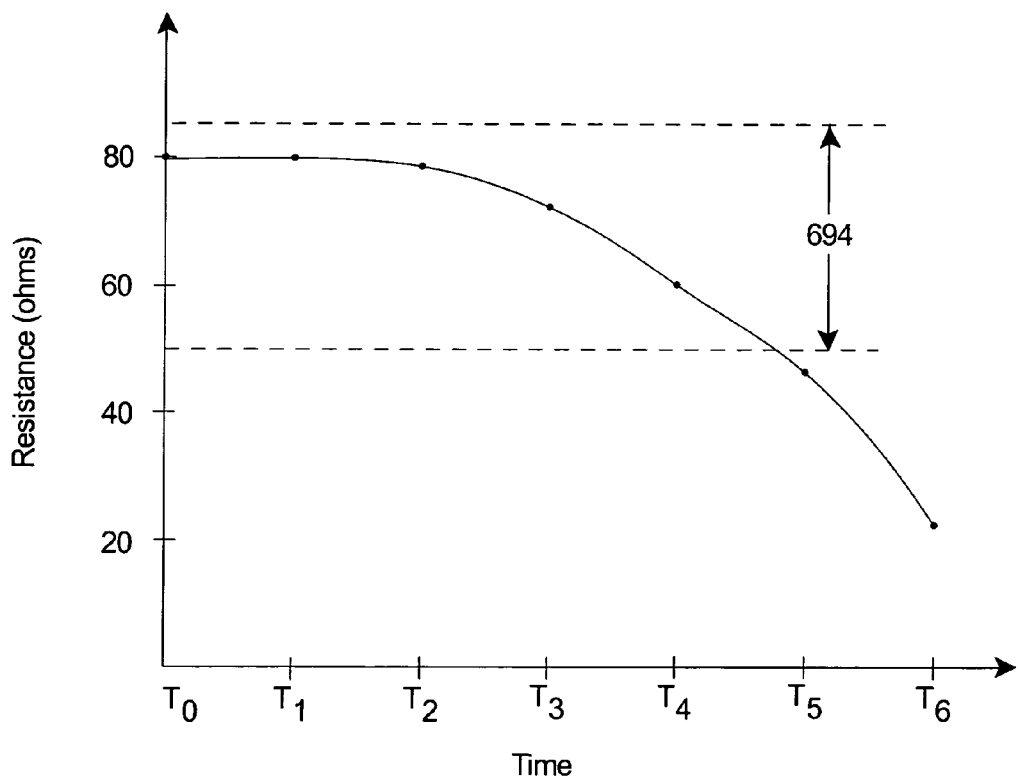
FIG. 6 is a representative graph of resistance as a function of time.

FIG. 6 is a representative graph showing results of one embodiment of the method of observing the response over time. In this embodiment, resistance of the slider mover as determined by the drive circuitry is logged and analyzed by the drive circuitry as a function of time. For example, assuming the acceptable range of resistance of the slider mover determined at the time of manufacture and/or testing is 50-85 ohms (indicated by dashed line range 694, at time $T_0$, a calculated resistance of 80 ohms is within the acceptable range. Thus, at time $T_0$, the operability of the slider mover is adequate.

The resistance can be periodically determined and logged as required. In this example, at times $T_1$ and $T_2$, the resistance remains at approximately 80 ohms, and is therefore within the range of acceptability for the slider mover. However, at times $T_3$ and $T_4$, the resistance of the slider mover has begun to decline. Although the resistance at times $T_3$ and $T_4$ is still within the acceptable range 694, the drive circuitry can recognize that future failure, e.g., resistance outside the acceptable range 694, may occur within a determinable period of time. Thus, the drive circuitry can provide advance notification to the user so that preemptive steps can be taken to avoid damage to the disk drive, loss of data, etc.

It is recognized that the curve illustrated in FIG. 6 is shown for representative purposes only, and that numerous other curves illustrating failure of the slider mover could have been used herein. For example, instead of a progressively declining curve, the drop in resistance could have been more abrupt. As another non-exclusive example, instead of a decline in resistance, resistance could have increased to outside the upper end of the acceptable range 694.

It is also recognized that prediction of future behavior of the slider mover can be accomplished by logging current or voltage over time, rather than resistance.

While the particular methods as herein disclosed in detail are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A method for monitoring the operability of a slider of a disk drive, the method comprising the steps of:
    providing a slider that includes a read/write head that magnetically interacts with a storage disk, and a slider mover that adjusts a head-to-disk spacing;
    controlling an electrical stimulus to the slider mover;
    measuring an actual electrical response from the slider mover;
    comparing the actual electrical response to an expected electrical response,
    determining an operability status of the slider mover using a drive circuitry; and
    providing notification when the actual electrical response differs from the expected electrical response by greater than a predetermined amount.

2. The method of claim 1 wherein the step of controlling an electrical stimulus includes controlling a voltage across the slider mover.

3. The method of claim 2 wherein the step of measuring an actual electrical response includes determining an electrical current that passes through the slider mover.

4. The method of claim 1 wherein the step of controlling an electrical stimulus includes controlling an electrical current that is directed to the slider mover.

5. The method of claim 4 wherein the step of measuring an actual electrical response includes determining the voltage across the slider mover.

6. The method of claim 1 wherein the step of comparing the actual electrical response includes determining whether the actual electrical response falls within a predetermined range of expected electrical responses.

7. The method of claim 1 wherein the step of comparing includes providing notification when actual electrical response differs from the expected electrical response by greater than 10 percent.

8. The method of claim 1 further comprising the step of calculating the resistance of the slider mover based on the electrical stimulus and the actual electrical response.

9. The method of claim 8 further comprising the step of comparing the calculated resistance of the slider mover with a previously determined expected resistance for the slider mover.

10. The method of claim 1 wherein the step of comparing includes monitoring changes in the actual electrical response over time.

11. The method of claim 10 further comprising the step of predicting the timing of a future failure of the slider mover with the drive circuitry based on the change in the actual electrical response over time.

12. A method for monitoring the operability of a slider of a disk drive, the method comprising the steps of:
    providing a slider that includes a read/write head and a spaced apart slider mover that adjusts a head-to-disk spacing;
    controlling an electrical stimulus with a drive circuitry to deliver power to the slider mover;
    measuring an actual electrical response from the slider mover with the drive circuitry; and
    determining an actual resistance of the slider mover with the drive circuitry based on the electrical stimulus and the actual electrical response.

13. The method of claim 12 wherein the step of controlling an electrical stimulus includes controlling a voltage across the slider mover.

14. The method of claim 13 wherein the step of measuring an actual electrical response includes determining an electrical current that passes through the slider mover.

15. The method of claim 14 wherein the step of determining an actual resistance is based on the voltage and the current.

16. The method of claim 12 wherein the step of controlling an electrical stimulus includes controlling an electrical current directed to the slider mover.

17. The method of claim 16 wherein the step of measuring an actual electrical response includes determining a voltage across the slider mover.

18. The method of claim 17 wherein the step of determining an actual resistance is based on the voltage and the electrical current.

19. The method of claim 12 further comprising the step of determining and storing within the disk drive an expected range of resistance of the slider mover.

20. The method of claim 19 further comprising the step of comparing the actual resistance with the expected range of resistance of the slider mover with the drive circuitry.

21. The method of claim 20 wherein the step of comparing includes providing notification when the actual resistance falls outside of the expected range of resistance of the slider mover.

22. The method of claim 12 wherein the step of determining the actual resistance includes monitoring changes in the actual resistance over time.

23. The method of claim 22 further comprising the step of determining changes in the expected range of resistance of the slider mover depending upon a temperature of the slider mover.

24. The method of claim 23 further comprising the step of comparing changes in the actual resistance with changes in the expected resistance.

25. The method of claim 24 wherein the step of comparing includes providing notification when changes in the actual resistance are different than the changes in the expected resistance by a predetermined amount.

26. A method for monitoring the operability of a slider of a disk drive, the method comprising the steps of:

directing an electrical current to a read/write head that magnetically interacts with a storage disk;

adjusting a head-to-disk spacing by controlling an electrical stimulus to a slider mover that is electrically isolated from the read/write head with a drive circuitry to deliver power to the slider mover;

measuring an actual electrical response from the slider mover with the drive circuitry;

comparing the actual electrical response to an expected electrical response to determine an operability status of the slider mover;

monitoring changes in the actual electrical response over time; and predicting the timing of a future failure of the slider mover with the drive circuitry based on the change in the actual electrical response over time.

27. The method of claim 26 wherein the step of controlling an electrical stimulus includes controlling a voltage across the slider mover.

28. The method of claim 27 wherein the step of measuring an actual electrical response includes determining an electrical current that passes through the slider mover.

29. The method of claim 26 wherein the step of controlling an electrical stimulus includes controlling an electrical current that is directed to the slider mover.

30. The method of claim 29 wherein the step of measuring an actual electrical response includes determining the voltage across the slider mover.

31. The method of claim 26 wherein the step of comparing the actual electrical response includes determining whether the actual electrical response falls within a predetermined range of expected electrical responses.

32. The method of claim 26 wherein the step of comparing includes providing notification when actual electrical response differs from the expected electrical response by greater than a predetermined amount.

33. The method of claim 32 wherein the step of comparing includes providing notification when actual electrical response differs from the expected electrical response by greater than 10 percent.

34. The method of claim 26 further comprising the step of calculating the resistance of the slider mover based on the electrical stimulus and the actual electrical response.

35. The method of claim 34 further comprising the step of comparing the calculated resistance of the slider mover with a previously determined expected resistance for the slider mover.

* * * * *